United States Patent
Seiden et al.

(10) Patent No.: US 11,561,967 B2
(45) Date of Patent: Jan. 24, 2023

(54) EXPOSING PARAMETERS IN REFERENCING WORKSHEETS

(71) Applicant: SIGMA COMPUTING, INC., San Francisco, CA (US)

(72) Inventors: Max H. Seiden, San Francisco, CA (US); Alena Gilevskaya, San Francisco, CA (US); Jason D. Frantz, San Francisco, CA (US)

(73) Assignee: SIGMA COMPUTING, INC., San Francisco, CA (US)

(*) Notice: Subject to any disclaimer, the term of this patent is extended or adjusted under 35 U.S.C. 154(b) by 95 days.

(21) Appl. No.: 16/913,058

(22) Filed: Jun. 26, 2020

(65) Prior Publication Data

US 2020/0409947 A1 Dec. 31, 2020

Related U.S. Application Data

(60) Provisional application No. 62/866,762, filed on Jun. 26, 2019.

(51) Int. Cl.
*G06F 16/242* (2019.01)
*G06F 16/2457* (2019.01)
*G06F 16/248* (2019.01)

(52) U.S. Cl.
CPC ........ *G06F 16/2428* (2019.01); *G06F 16/248* (2019.01); *G06F 16/2445* (2019.01); *G06F 16/24573* (2019.01)

(58) Field of Classification Search
CPC .......... G06F 16/2428; G06F 16/24573; G06F 16/248; G06F 16/2445; G06F 40/18; G06F 16/221; G06F 16/252; G06F 16/245
See application file for complete search history.

(56) References Cited

U.S. PATENT DOCUMENTS

| | | | | |
|---|---|---|---|---|
| 6,701,485 B1 * | 3/2004 | Igra | ......................... | G06F 40/18 715/210 |
| 7,991,804 B2 * | 8/2011 | Battagin | ................. | G06F 40/18 707/999.102 |
| 10,503,822 B1 * | 12/2019 | Spencer | ................ | G06F 40/197 715/210 |
| 2012/0137203 A1 * | 5/2012 | Schodl | .................... | G06F 40/18 715/219 |
| 2013/0151938 A1 * | 6/2013 | Waldman | ................ | G06F 40/18 715/210 |

* cited by examiner

*Primary Examiner* — Yuk Ting Choi

(57) ABSTRACT

Exposing parameters in referencing worksheets including receiving a request for a referencing worksheet linked from a data source worksheet, wherein the data source worksheet is a presentation of a data set from a database, and wherein the data source worksheet comprises a function utilizing an exposable parameter; generating the referencing worksheet from the data source worksheet, wherein the referencing worksheet exposes the exposable parameter without exposing the function utilizing the exposable parameter; and presenting the referencing worksheet with the exposable parameter without allowing access to the function utilizing the exposable parameter.

14 Claims, 6 Drawing Sheets

… …

EXPOSING PARAMETERS IN REFERENCING WORKSHEETS

CROSS-REFERENCE TO RELATED APPLICATIONS

This application is a non-provisional application for patent entitled to a filing date and claiming the benefit of earlier-filed U.S. Provisional Patent Application Ser. No. 62/866,762, filed Jun. 26, 2020.

BACKGROUND

Field of the Invention

The field of the invention is data processing, or, more specifically, methods, apparatus, and products for exposing parameters in referencing worksheets.

Description of Related Art

Modern businesses may store large amounts of data in remote databases within cloud-based data warehouses. This data may be accessed using database query languages, such as structured query language (SQL). Further, manipulating the data stored in the database may require constructing complex queries beyond the abilities of most users.

SUMMARY

Methods, systems, and apparatus for exposing parameters in referencing worksheets. Exposing parameters in referencing worksheets includes receiving a request for a referencing worksheet linked from a data source worksheet, wherein the data source worksheet is a presentation of a data set from a database, and wherein the data source worksheet comprises a function utilizing an exposable parameter; generating the referencing worksheet from the data source worksheet, wherein the referencing worksheet exposes the exposable parameter without exposing the function utilizing the exposable parameter; and presenting the referencing worksheet with the exposable parameter without allowing access to the function utilizing the exposable parameter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
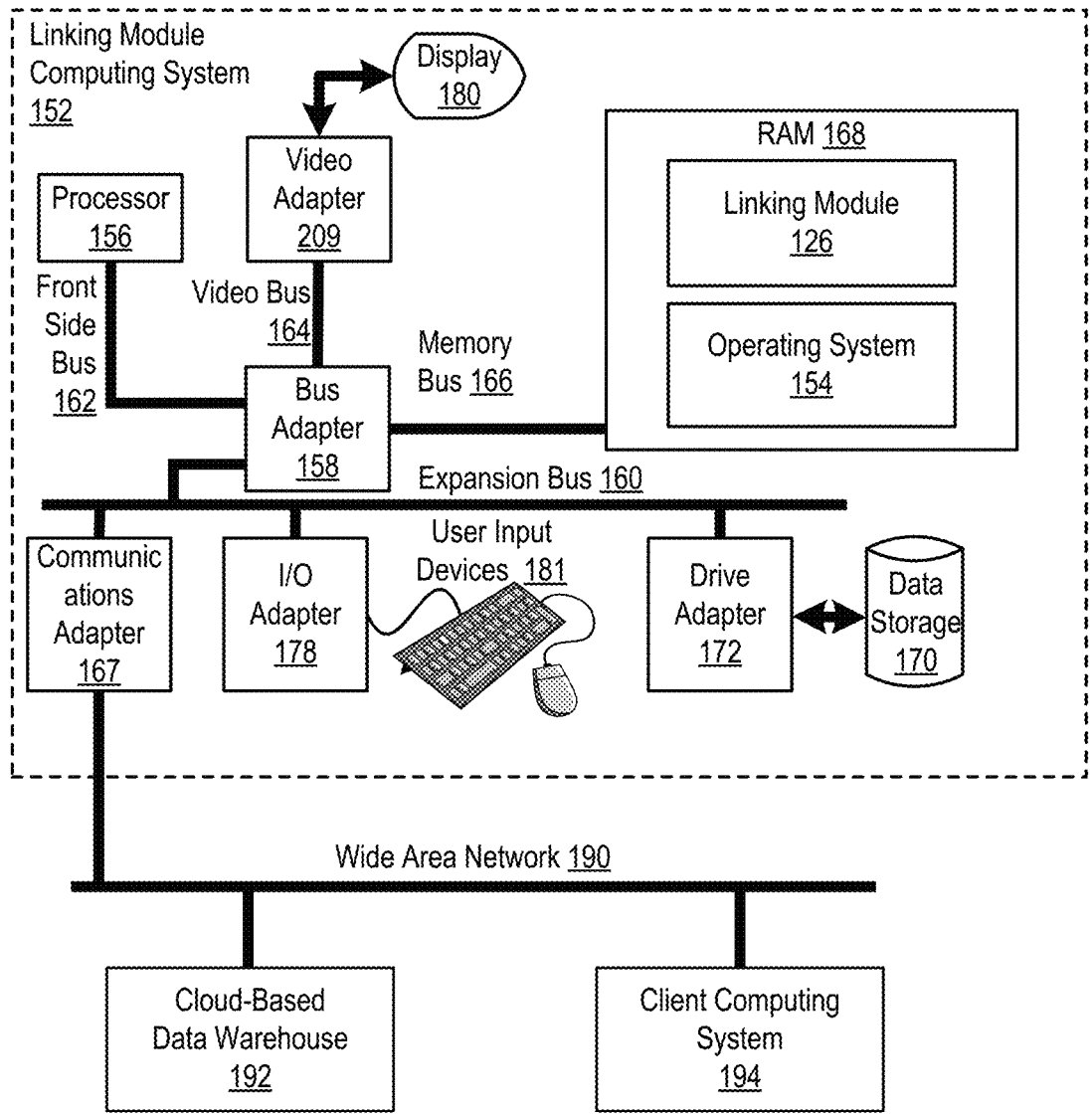
FIG. 1 sets forth a block diagram of an example system configured for exposing parameters in referencing worksheets according to embodiments of the present invention.

Exemplary methods, apparatus, and products for exposing parameters in referencing worksheets in accordance with the present invention are described with reference to the accompanying drawings, beginning with FIG. 1. FIG. 1 sets forth a block diagram of automated computing machinery comprising an exemplary linking module computing system (152) configured for exposing parameters in referencing worksheets according to embodiments of the present invention. The linking module computing system (152) of FIG. 1 includes at least one computer processor (156) or 'CPU' as well as random access memory (168) (RAM') which is connected through a high speed memory bus (166) and bus adapter (158) to processor (156) and to other components of the linking module computing system (152).

Stored in RAM (168) is an operating system (154). Operating systems useful in computers configured for exposing parameters in referencing worksheets according to embodiments of the present invention include UNIX™, Linux™, Microsoft Windows™, AIX™ IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the linking module (126), a module for exposing parameters in referencing worksheets according to embodiments of the present invention.

The linking module computing system (152) of FIG. 1 includes disk drive adapter (172) coupled through expansion bus (160) and bus adapter (158) to processor (156) and other components of the linking module computing system (152). Disk drive adapter (172) connects non-volatile data storage to the linking module computing system (152) in the form of data storage (170). Disk drive adapters useful in computers configured for exposing parameters in referencing worksheets according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example linking module computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example linking module computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary linking module computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for exposing parameters in referencing worksheets according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the linking module (126) on the linking module computing system (152).

Figure 2:
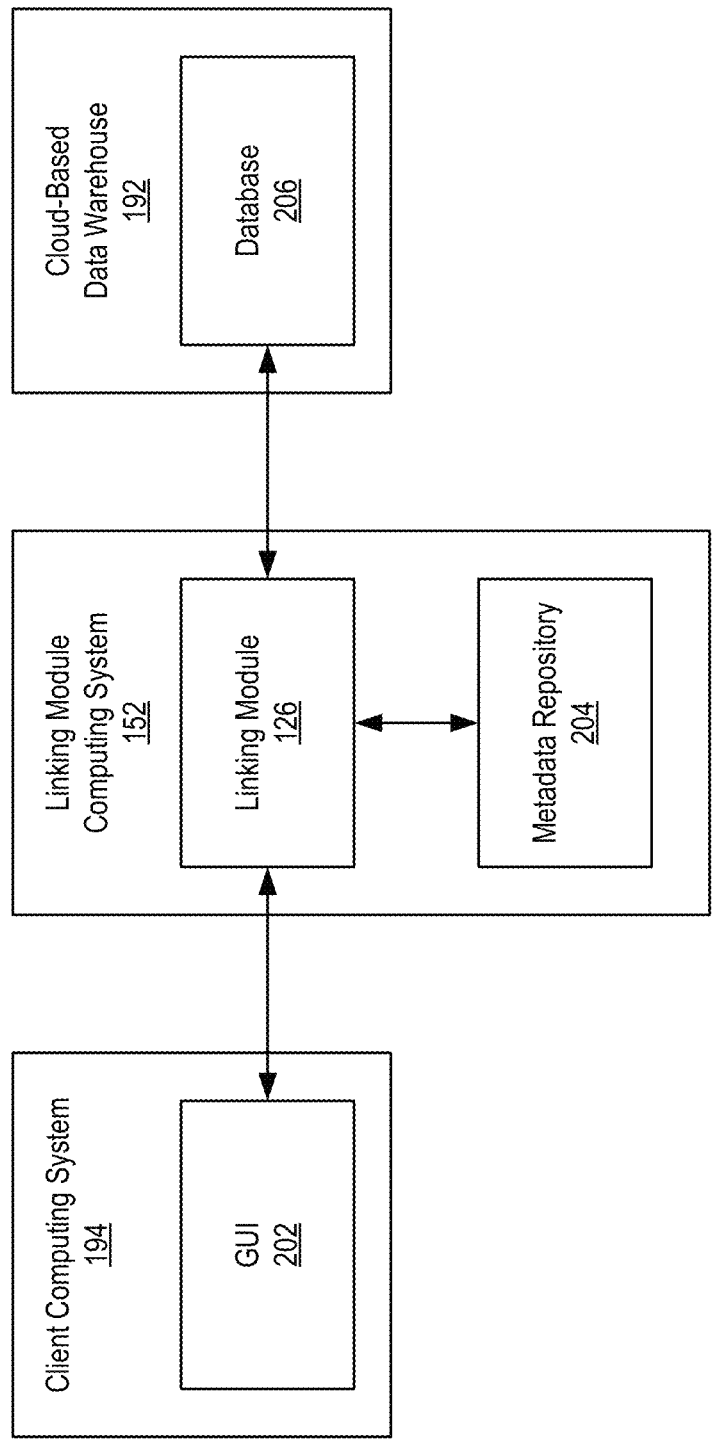
FIG. 2 sets forth a block diagram of an example system configured for exposing parameters in referencing worksheets according to embodiments of the present invention.

FIG. 2 shows an exemplary system for exposing parameters in referencing worksheets according to embodiments of the present invention. As shown in FIG. 2, the system includes a client computing system (194), a linking module computing system (152), and a cloud-based data warehouse (192). The client computing system (194) includes a graphical user interface (GUI) (202). The linking module computing system (152) includes a linking module (126) and a metadata repository (204). The cloud-based data warehouse (192) includes a database (206).

The GUI (202) is a visual presentation configured to present data sets in the form of a worksheet and graphical elements to a client and receives client input from the client. The GUI (202) may be presented, in part, by the linking module (126) and displayed on a client computing system (194) (e.g., on a system display or mobile touchscreen). The linking module (126) may be part of an Internet application hosted on the linking module computing system (152) and initiate the presentation of the GUI (202) on the client computing system (194).

The GUI (202) presents, in part, worksheets to a user. A worksheet is a presentation of a data set from a database (206). A referencing worksheet is a worksheet that is linked from another worksheet (referred to as a data source worksheet). The referencing worksheet inherits the data set presented in the data source worksheet (i.e., data not excluded from presentation). The referencing worksheet may also inherit the results of functions applied to other data but not the functions themselves. The referencing worksheet may be limited to the data set presented or otherwise made available in the data source worksheet (unless the user generating the referencing worksheet has access to excluded data in the database). A referencing worksheet may be linked from any number of data sources, including multiple data source worksheets. Further, any additional changes made to the data source worksheet are reflected in the referencing worksheet. For example, if a column is added to and presented in the data source worksheet, the column would then appear in or be available to the referencing worksheet.

For example, the CFO of a corporation may have unrestricted access to a financial database for the corporation, and using the financial database, the CFO creates a data source worksheet for a salary budget. The data source worksheet may be generated from the database using a data set that includes an employee identifier column, an employee department column, an employee salary column, and a column indicating a 1-10 score given to the employee based on a subjective evaluation of the importance of that employee to the company. The CFO may create an additional calculation column that calculates a yearly bonus for the employee based, in part, on the employee subjective value column. The CFO may then sort the worksheet by employee department and create an additional calculation column that calculates the total salary and bonus budget for each department. Finally, the CFO may hide the employee salary column and the employee subjective value column so that no other users may view those columns.

Continuing with the example, an accountant at the corporation without access to the financial database may create a referencing worksheet linked from the CFOs data source worksheet. The referencing worksheet would present the employee identifier column, the employee department column, the employee yearly bonus column, and the total salary and bonus budget column. Because the employee salary column and the employee subjective value column were excluded from presentation in the data source worksheet, the referencing worksheet would not have access to the employee salary column or the employee subjective value column. Further, only the results of the applied function would be visible and accessible by the accountant and not the function itself. Therefore, the referencing worksheet would not disclose that the yearly bonus column was calculated using the subjective value column. The accountant may then edit the referencing worksheet to build upon the work done by the CFO in creating the data source worksheet.

The referencing worksheet may present at least a subset of the data set presented by the data source worksheet. Specifically, the data source worksheet presents a data set and may or may not exclude a portion of that data set from presentation. A referencing worksheet linked from the data source worksheet will only have access to the portion of the data set presented in the data source worksheet (without another data source available). Therefore, only the subset of the data set presented in the data source worksheet will be accessible (and presentable) in the referencing worksheet.

The linking module (126) is hardware, software, or an aggregation of hardware and software configured to receive requests from the client computing system (194), via the GUI (GUI). The linking module (126) is also configured to generate database queries in response to requests for data sets and manipulations of those data sets. The linking module (126) may be part of a database query generator that generates the database query. The database query may be populated based on the worksheet metadata.

The linking module (126) presents, via the GUI (202), a worksheet using the information in the worksheet metadata. Worksheet metadata is data that describes a worksheet. Specifically, the worksheet metadata may include a description of the data set, the formulas to be applied to the data set, and the presentation structure of the data set. The description of the data set describes which data is to be requested via the database query. The description of the data set may include which columns and rows of data are to be retrieved from the database (206) via the database query. The functions to be applied to the data set may include the manipulations of the data in the columns and rows received in the data set. Such manipulations may include calculation columns that apply a function to data in the data set.

The presentation structure of the data set may include presentation selections made by a user. The presentation structure may include the hierarchical relationship between the columns, filters applied to the data, and the manner in which the data is sorted. The presentation structure of the data set may also include the GUI visibility of particular data within the data set. GUI visibility may be altered based on filter settings of the data or on the visibility status (e.g., hidden or not hidden) of a column within the data set. The presentation structure of the data set may also include the formatting of the worksheet, such as the size of rows and columns.

Worksheet metadata may also include a reference to, or identifier of, the worksheet metadata for a different worksheet. For example, the worksheet metadata for a referencing worksheet may include a reference to the data source worksheet from which the referencing worksheet was linked. Further, referencing worksheet metadata may lack a reference to the database or data set upon which the data source worksheet was built. Rather, the referencing worksheet metadata may only include a reference to the data source worksheet metadata, and that reference is used to retrieve the data source worksheet metadata. Because the referencing worksheet metadata may lack a reference to the database or data set, both the referencing worksheet metadata and data source worksheet metadata are used to generate the database query.

A function within a worksheet may include an exposable parameter. An exposable parameter is variable within a worksheet function that can be presented and adjusted in a referencing worksheet without presenting, adjusting, or otherwise exposing the worksheet function itself. For example, a data source worksheet may be created with a calculation column that computes a result based on a particular variable. The variable may be designated as an exposable parameter (e.g., using a special notation within the function). A referencing worksheet linked from the data source worksheet will then be able to view and adjust the exposable parameter and therefore changing the result of the calculation column without access to the underlying function. Because a referencing worksheet may not allow access to an underlying function within a data source worksheet, the exposable parameter provides a mechanism to adjust a function in specific, intentional ways without providing unlimited access to the function.

As a specific example, a regional manager may oversee a group of local managers for a retail store. Each local manager's store may be subject to the different taxes of the local jurisdiction. The regional manager may create a data source worksheet with a calculation column that computes the final sale price of each item based on the taxes of the local jurisdiction. The regional manager may set the value of the local taxes as an exposable parameter. Each local manager may then be provided their own referencing worksheet linked from the regional manager's worksheet. Each local manager may then be able to adjust the local taxes as an exposable parameter on their respective referencing worksheet based on their own jurisdiction's taxes. Further, the local manager would not have access to the underlying function, and therefore preventing any inadvertent altering of the underlying function.

The metadata repository (204) is an aggregation of hardware and software used to store worksheet metadata. Worksheet metadata may be retrieved from the metadata repository (204) using a reference to, or identifier of, the worksheet metadata. The database (206) is a collection of data and a management system for the data. A data set is a collection of data from the database (206). The data set may be an organization of data generated in response to a database query and provided to the linking module (126). The data set may include data organized into columns and rows.

Figure 3:
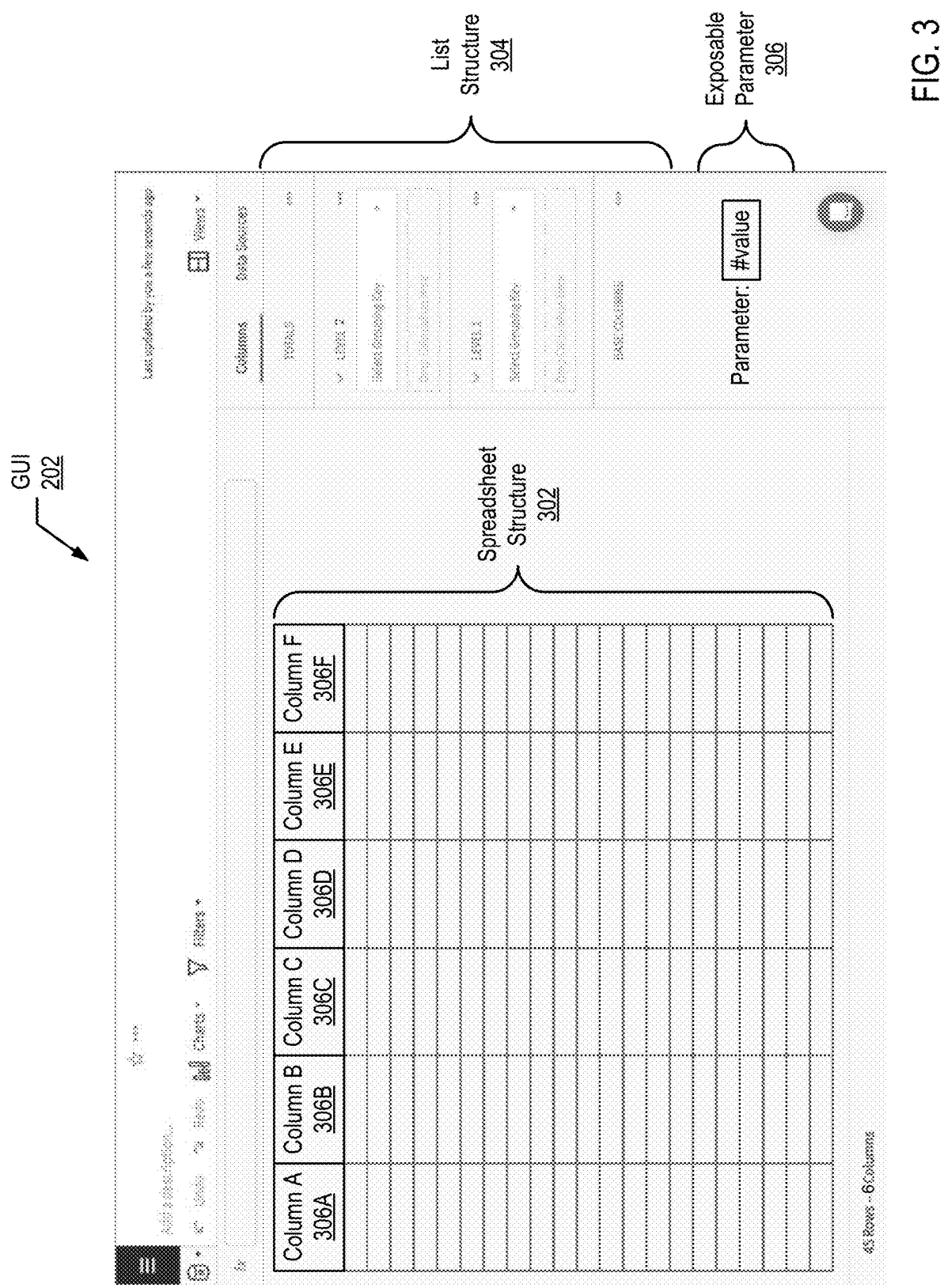
FIG. 3 sets forth a block diagram of an example system configured for exposing parameters in referencing worksheets according to embodiments of the present invention.

FIG. 3 shows an exemplary system for exposing parameters in referencing worksheets according to embodiments of the present invention. As shown in FIG. 3, the exemplary GUI (202) includes a spreadsheet structure (302), a list structure (304), and an exposable parameter (306). The spreadsheet structure (302) includes a data set (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculations using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include the ability to set or adjust an exposable parameter (306). The exposable parameter (306) may include a default "#value" that is alterable by a user of the GUI (202). The exposable parameter (306) may be presented in a number of different forms, such as an entry field (as shown in FIG. 3), a slider, a radio button, a combo box, etc. The GUI (202) may further include a chart based on one or more of the columns of the spreadsheet structure (302), including a calculation column utilizing a function with an exposable parameter. Altering the exposable parameter may change the chart presented in the GUI (202).

Figure 4:
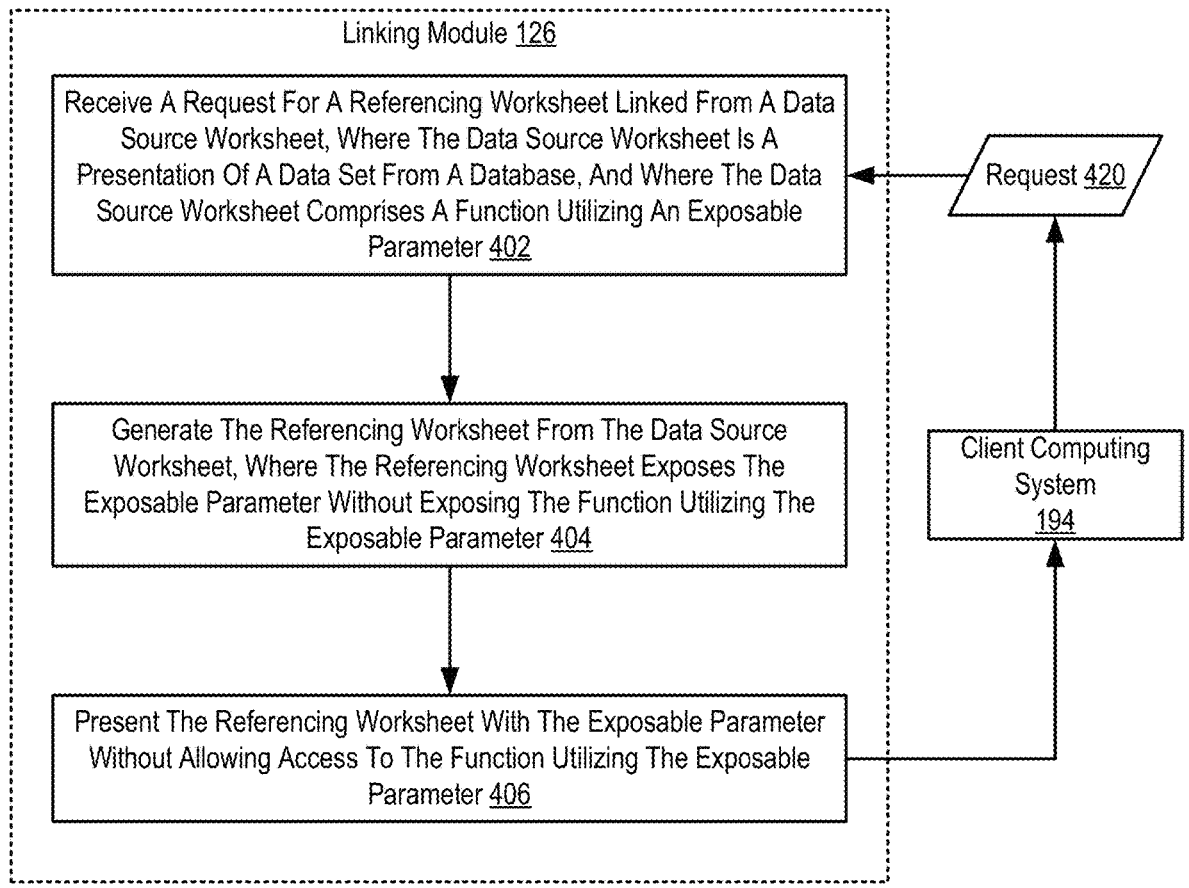
FIG. 4 sets forth a flow chart illustrating an exemplary method for exposing parameters in referencing worksheets according to embodiments of the present invention.

For further explanation, FIG. 4 sets forth a flow chart illustrating an exemplary method for exposing parameters in referencing worksheets according to embodiments of the present invention that includes receiving (402) a request (420) for a referencing worksheet linked from a data source worksheet, wherein the data source worksheet is a presentation of a data set from a database, and wherein the data source worksheet comprises a function utilizing an exposable parameter. Receiving (402) a request (420) for a referencing worksheet linked from a data source worksheet, wherein the data source worksheet is a presentation of a data set from a database, and wherein the data source worksheet comprises a function utilizing an exposable parameter may be carried out by the linking module (126) receiving the request (420) from a user via a GUI on the client computing system (194) to generate the referencing worksheet using a data source worksheet. The referencing worksheet metadata may be generated and populated using the contents of request (420).

The request (420) may include a reference to the data source worksheet and a selection of columns from the data source worksheet. The request may include a selection of all columns to present the entire data set from the data source worksheet. Alternatively, the request may include a selection of fewer than all columns to present a subset of the data set from the data source worksheet. The request (420) may include other selections from the data source worksheet, such as an indication as to whether the referencing worksheet is to inherit the presentation structure of the data source worksheet (i.e., formatting).

The method of FIG. 4 further includes generating (404) the referencing worksheet from the data source worksheet, wherein the referencing worksheet exposes the exposable parameter without exposing the function utilizing the exposable parameter. Generating (404) the referencing worksheet from the data source worksheet, wherein the referencing worksheet exposes the exposable parameter without exposing the function utilizing the exposable parameter may be carried out by the linking module (126) parsing the request for the reference to the data source worksheet metadata and then retrieving the data source worksheet metadata from a metadata repository using the reference. Once the data source worksheet metadata is retrieved, the referencing worksheet metadata is generated. The referencing worksheet metadata includes the exposable parameter and the ability to evaluate the data source worksheet function using the exposable parameter. Evaluating the function using the exposable parameter may include accessing the data source worksheet metadata.

The method of FIG. 4 further includes presenting (406) the referencing worksheet with the exposable parameter without allowing access to the function utilizing the exposable parameter. Presenting (406) the referencing worksheet with the exposable parameter without allowing access to the function utilizing the exposable parameter may be carried out by the linking module (126) using the referencing worksheet metadata to present the referencing worksheet, including exposing the exposable parameter, using the spreadsheet structure of the GUI on the client computing system (194). The exposable parameter may be exposed and adjustable using a portion of the GUI. Once the referencing worksheet is presented on the client computing system (194), a user of the client computing system (194) may view the results of the function utilizing the exposable parameter, but is not able to view the function itself, or adjust any portion of the function that is not an exposable parameter.

The above limitations improve the operation of the computer system by allowing work on a first worksheet to be reused in subsequent worksheets linked from the first worksheet while allowing certain portions of underlaying functions to be adjusted. Specifically, a single general data source worksheet may be generated and maintained, and one or more referencing worksheets may be linked from the data source worksheet. Each of the referencing worksheets may adjust the exposable parameter to fit their needs without exposing the function to the users of the referencing worksheet. This is accomplished by generating a data source worksheet with a function utilizing an exposable parameter and creating the referencing worksheet that exposes the exposable parameter while hiding the underlying function.

Figure 5:
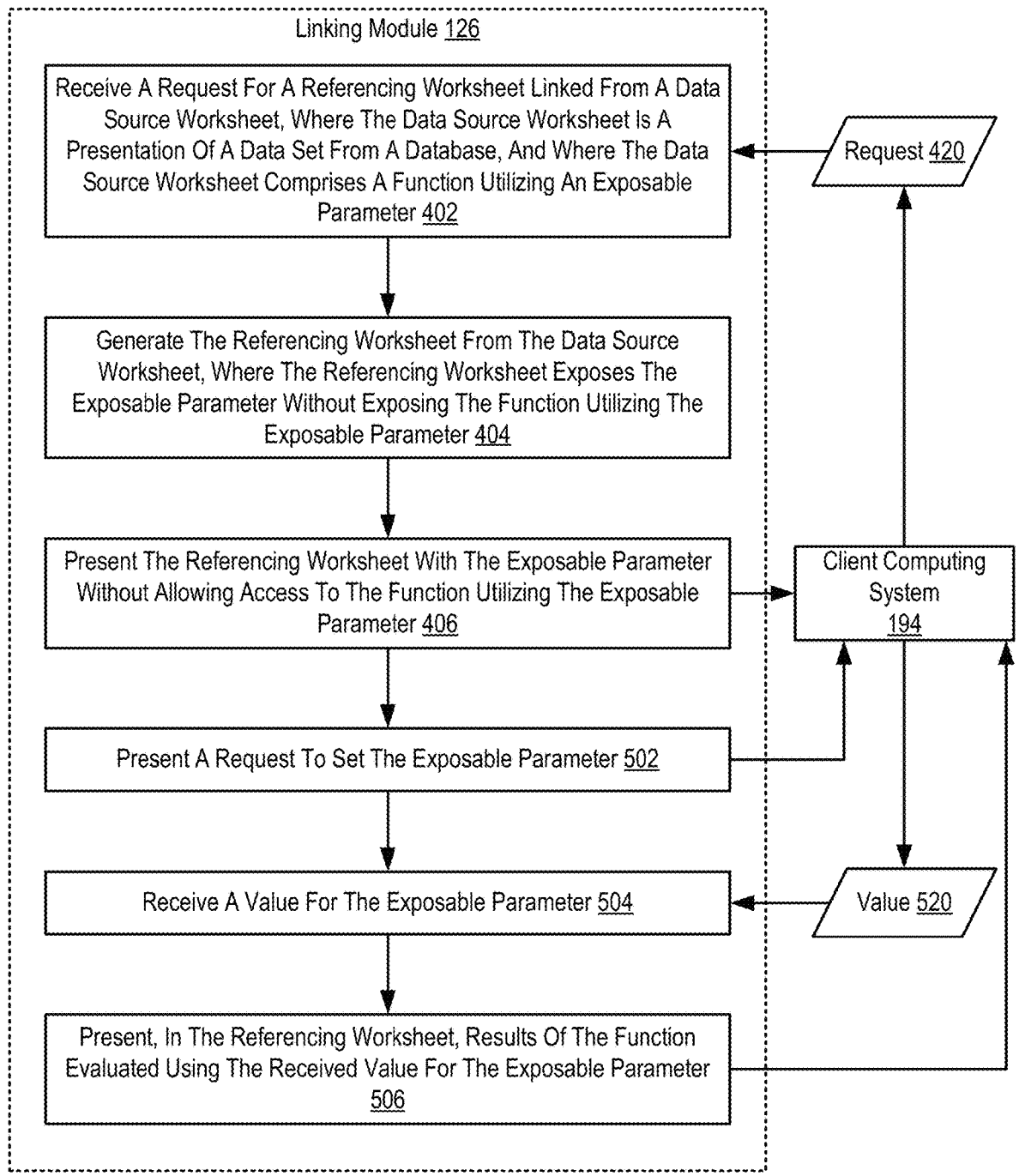
FIG. 5 sets forth a flow chart illustrating an exemplary method for exposing parameters in referencing worksheets according to embodiments of the present invention.

For further explanation, FIG. 5 sets forth a flow chart illustrating a further exemplary method for exposing parameters in referencing worksheets according to embodiments of the present invention that includes receiving (402) a request (420) for a referencing worksheet linked from a data source worksheet, wherein the data source worksheet is a presentation of a data set from a database, and wherein the data source worksheet comprises a function utilizing an exposable parameter; generating (404) the referencing worksheet from the data source worksheet, wherein the referencing worksheet exposes the exposable parameter without exposing the function utilizing the exposable parameter; and presenting (406) the referencing worksheet with the exposable parameter without allowing access to the function utilizing the exposable parameter.

The method of FIG. 5 differs from the method of FIG. 4, however, in that the method of FIG. 5 further includes presenting (502) a request to set the exposable parameter; receiving (504) a value (520) for the exposable parameter; and presenting (506), in the referencing worksheet, results of the function evaluated using the received value for the exposable parameter. Presenting (502) a request to set the exposable parameter may be carried out by the linking module (126) utilizing a portion of the GUI on the client computing system (194) and presenting a GUI element to receive an input value for the exposable parameter.

Receiving (504) a value (520) for the exposable parameter may be carried out by the linking module (126) detecting that a user has manipulated the GUI on the client computing system (194) to express a value in the GUI element dedicated to the exposable parameter. The value may be received in the form of a state specification from the GUI, such as a JavaScript Object Notation specification. Presenting (506), in the referencing worksheet, results of the function evaluated using the received value for the exposable parameter may be carried out by the linking module (126) reevaluating the function using the received exposable parameter and presenting the results in one or more columns of the referencing worksheet presented in the spreadsheet structure of the GUI.

Figure 6:
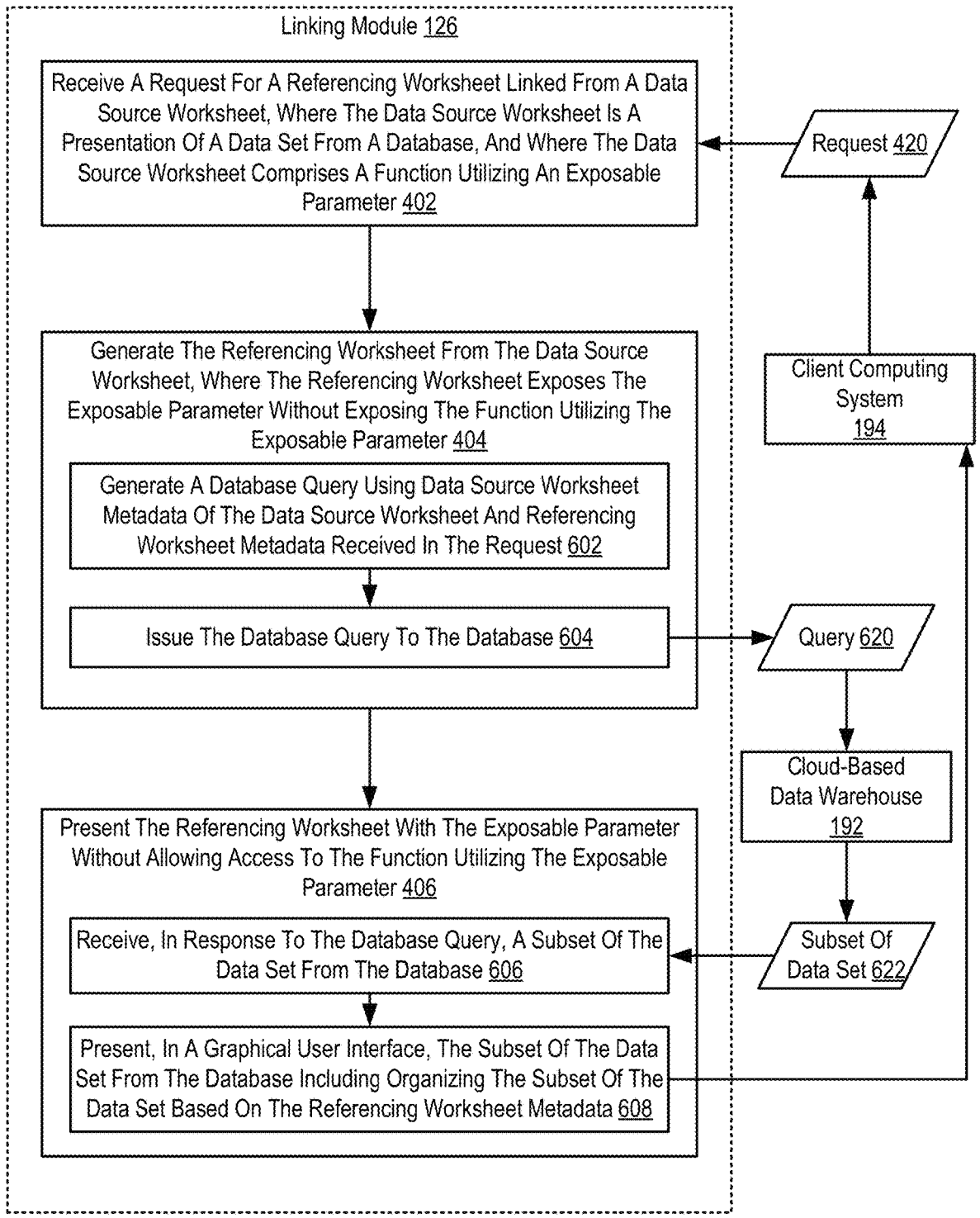
FIG. 6 sets forth a flow chart illustrating an exemplary method for exposing parameters in referencing worksheets according to embodiments of the present invention.

For further explanation, FIG. 6 sets forth a flow chart illustrating a further exemplary method for exposing parameters in referencing worksheets according to embodiments of the present invention that includes receiving (402) a request (420) for a referencing worksheet linked from a data source worksheet, wherein the data source worksheet is a presentation of a data set from a database, and wherein the data source worksheet comprises a function utilizing an exposable parameter; generating (404) the referencing worksheet from the data source worksheet, wherein the referencing worksheet exposes the exposable parameter without exposing the function utilizing the exposable parameter; and presenting (406) the referencing worksheet with the exposable parameter without allowing access to the function utilizing the exposable parameter.

The method of FIG. 6 differs from the method of FIG. 4, however, in that generating (404) the referencing worksheet from the data source worksheet, wherein the referencing worksheet exposes the exposable parameter without exposing the function utilizing the exposable parameter includes generating (602) a database query (620) using data source worksheet metadata of the data source worksheet and referencing worksheet metadata received in the request (420); and issuing (604) the database query (620) to the database.

Generating (602) a database query (620) using data source worksheet metadata of the data source worksheet and referencing worksheet metadata received in the request (420) may be carried out by the linking module (126) using the description of the data set, the formulas to be applied to the data set, and the presentation structure of the data set in the data source worksheet metadata and the referencing worksheet metadata populated by the request. The database query (620) may be an SQL statement. Issuing (604) the database query (620) to the database may be carried out by the linking module (126) sending the generated database query (620) over a wide area network to the database on the cloud-based data warehouse (192).

The method of FIG. 6 also differs from the method of FIG. 4 in that presenting (406) the referencing worksheet with the exposable parameter without allowing access to the function utilizing the exposable parameter includes receiving (606), in response to the database query (620), a subset of the data set (622) from the database; and presenting (608), in a graphical user interface, the subset of the data set (622) from the database including organizing the subset of the data set (622) based on the referencing worksheet metadata. Receiving (606), in response to the database query (620), a subset of the data set (622) from the database may be carried out by the linking module (126) obtaining at least the subset of the data set (622) from the database on the cloud-based data warehouse (192).

The function utilizing the exposable parameter may be evaluated (and reevaluated upon updating the value) without requiring additional data retrieval from the database on the cloud-based data warehouse (192). Specifically, the function may use, as input, rows from the data set that have been previously retrieved from the database. If a new value is set for the exposable parameter, the linking module (126) may use the previously retrieved data set to evaluate the function with the new exposable parameter.

Presenting (608), in a graphical user interface, the subset of the data set (622) from the database including organizing the subset of the data set (622) based on the referencing worksheet metadata may be carried out by the linking module (126) generating the referencing worksheet from the referencing worksheet metadata and received subset of the data set (324). Presenting the subset of the data set (424) may include applying any presentation structures from the data source worksheet metadata or the request (420).

In view of the explanations set forth above, readers will recognize that the benefits of exposing parameters in referencing worksheets according to embodiments of the present invention include:
  Improving the operation of a computing system by allowing parameter adjustments on a worksheet linked from a data source worksheet, increasing computing system efficiency and usability.
  Improving the operation of a computing system by providing users of referencing worksheets access to a parameter while limiting access to sensitive data within the function utilizing the parameter, increasing computing system usability and security.
  Improving the operation of a computing system by generating and maintaining a single general data source worksheet that is reused by any number of referencing worksheet tailored for a more specific purpose, increasing computing system efficiency and usability.

Exemplary embodiments of the present invention are described largely in the context of a fully functional computer system for exposing parameters in referencing worksheets. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of exposing parameters in referencing worksheets, the method comprising: receiving a request for a referencing worksheet linked from a data source worksheet, wherein the data source worksheet is a presentation of a data set from a database, and wherein the data source worksheet comprises a function utilizing an exposable parameter, wherein the function is applied within the data source worksheet utilizing the exposable parameter; generating the referencing worksheet from the data source worksheet, wherein the referencing worksheet exposes the exposable parameter without exposing the function utilizing the exposable parameter, wherein generating the referencing worksheet from the data source worksheet comprises: generating a database query using data source worksheet metadata of the data source worksheet and referencing worksheet metadata received in the request; and issuing the database query to the database, wherein the database is within a cloud-based data warehouse; and presenting the referencing worksheet with the exposable parameter without allowing access to the function utilizing the exposable parameter, wherein the reference worksheet presents at least a subset of the data set presented by the data source worksheet, wherein presenting the referencing worksheet with the exposable parameter without allowing access to the function utilizing the exposable parameter comprises: receiving, in response to the database query, a subset of the data set from the database; and presenting, in a graphical user interface, the subset of the data set from the database including organizing the subset of the data set based on the referencing worksheet metadata.

2. The method of claim 1, further comprising:
presenting a request to set the exposable parameter.

3. The method of claim 2, further comprising:
receiving a value for the exposable parameter; and
presenting, in the referencing worksheet, results of the function evaluated using the received value for the exposable parameter.

4. The method of claim 1, wherein altering the exposable parameter changes a chart presented in the referencing worksheet.

5. The method of claim 1, wherein the referencing worksheet is presented without presenting the data source worksheet.

6. An apparatus for exposing parameters in referencing worksheets, the apparatus comprising a computer processor, a computer memory operatively coupled to the computer processor, the computer memory having disposed within it computer program instructions that, when executed by the computer processor, cause the apparatus to carry out the steps of: receiving a request for a referencing worksheet linked from a data source worksheet, wherein the data source worksheet is a presentation of a data set from a database, and wherein the data source worksheet comprises a function utilizing an exposable parameter, wherein the function is applied within the data source worksheet utilizing the exposable parameter; generating the referencing worksheet from the data source worksheet, wherein the referencing worksheet exposes the exposable parameter without exposing the function utilizing the exposable parameter, wherein generating the referencing worksheet from the data source worksheet comprises: generating a database query using data source worksheet metadata of the data source worksheet and referencing worksheet metadata received in the request; and issuing the database query to the database; and presenting the referencing worksheet with the exposable parameter without allowing access to the function utilizing the exposable parameter, wherein the worksheet presents at least a subset of the data set presented by the data source worksheet, wherein presenting the referencing worksheet with the exposable parameter without allowing access to the function utilizing the exposable parameter comprises: receiving, in response to the database query, a subset of the data set from the database; and presenting, in a graphical user interface, the subset of the data set from the database including organizing the subset of the data set based on the referencing worksheet metadata.

7. The apparatus of claim 6, wherein the computer program instructions further cause the apparatus to carry out the steps of:
presenting a request to set the exposable parameter.

8. The apparatus of claim 7, wherein the computer program instructions further cause the apparatus to carry out the steps of:
receiving a value for the exposable parameter; and
presenting, in the referencing worksheet, results of the function evaluated using the received value for the exposable parameter.

9. The apparatus of claim 6, wherein altering the exposable parameter changes a chart presented in the referencing worksheet.

10. The apparatus of claim 6, wherein the referencing worksheet is presented without presenting the data source worksheet.

11. A computer program product for exposing parameters in referencing worksheets, the computer program product disposed upon a non-transitory computer readable medium, the computer program product comprising computer program instructions that, when executed, cause a computer to carry out the steps of: receiving a request for a referencing worksheet linked from a data source worksheet, wherein the data source worksheet is a presentation of a data set from a database, and wherein the data source worksheet comprises a function utilizing an exposable parameter, wherein the function is applied within the data source worksheet utilizing the exposable parameter; generating the referencing worksheet from the data source worksheet, wherein the referencing worksheet exposes the exposable parameter without exposing the function utilizing the exposable parameter, wherein generating the referencing worksheet from the data source worksheet comprises: generating a database query using data source worksheet metadata of the data source worksheet and referencing worksheet metadata received in the request; and issuing the database query to the database; and presenting the referencing worksheet with the exposable parameter without allowing access to the function utilizing the exposable parameter, wherein the referencing worksheet presents at least a subset of the data set presented by the data source worksheet, wherein presenting the referencing worksheet with the exposable parameter without allowing access to the function utilizing the exposable parameter comprises: receiving, in response to the database query, a subset of the data set from the database; and presenting, in a graphical user interface, the subset of the data set from the database including organizing the subset of the data set based on the referencing worksheet metadata.

12. The computer program product of claim 11, wherein the computer program instructions further cause the computer to carry out the steps of:
presenting a request to set the exposable parameter.

13. The computer program product of claim 12, wherein the computer program instructions further cause the computer to carry out the steps of:
receiving a value for the exposable parameter; and
presenting, in the referencing worksheet, results of the function evaluated using the received value for the exposable parameter.

14. The computer program product of claim 11, wherein altering the exposable parameter changes a chart presented in the referencing worksheet.

* * * * *